United States Patent [19]

Schmitt

[11] Patent Number: 5,853,077
[45] Date of Patent: Dec. 29, 1998

[54] ARTICLE HANDLING DEVICE, COMBINATION AND METHODS

[75] Inventor: Werner H. Schmitt, Falls Church, Va.

[73] Assignee: Hoppmann Corporation, Chantilly, Va.

[21] Appl. No.: 730,579

[22] Filed: Oct. 15, 1996

Related U.S. Application Data

[63] Continuation-in-part of Ser. No. 363,019, Dec. 23, 1994, Pat. No. 5,564,551.

[51] Int. Cl.$^6$ ................................................... B65G 47/24
[52] U.S. Cl. ........................... 198/383; 198/390; 198/392
[58] Field of Search ................................ 198/383, 390, 198/392, 402, 403; 193/44

[56] References Cited

U.S. PATENT DOCUMENTS

| | | |
|---|---|---|
| 2,500,698 | 3/1950 | Mills . |
| 3,114,159 | 12/1963 | Yoshikawa . |
| 3,578,142 | 5/1971 | Burgess, Jr. . |
| 3,817,423 | 6/1974 | McKnight . |
| 4,062,462 | 12/1977 | Hentz et al. ........................ 198/390 X |
| 4,305,496 | 12/1981 | Hoppmann, et al. . |
| 4,723,661 | 2/1988 | Hoppmann, et al. . |
| 4,960,195 | 10/1990 | Yamaguchi et al. ................ 198/390 X |
| 4,979,607 | 12/1990 | Fogg . |
| 5,161,302 | 11/1992 | Mueller . |
| 5,564,551 | 10/1996 | Schmitt ................................... 198/392 |

FOREIGN PATENT DOCUMENTS

| | | | |
|---|---|---|---|
| 0554202 | 8/1993 | European Pat. Off. ............... | 198/392 |
| 0578602 | 1/1994 | European Pat. Off. ............... | 198/392 |
| 83917 | 4/1987 | Japan .................................... | 198/390 |
| 37016 | 2/1988 | Japan .................................... | 198/383 |
| 225208 | 9/1990 | Japan .................................... | 198/383 |
| 239019 | 9/1990 | Japan .................................... | 198/383 |
| 1602677 | 10/1990 | U.S.S.R. ................................ | 198/390 |

*Primary Examiner*—James R. Bidwell
*Attorney, Agent, or Firm*—Birch, Stewart, Kolasch & Birch, LLP

[57] ABSTRACT

A rotary puck conveying mechanism and method will qualify articles and place them within a puck or article handling device. This puck has a centrally disposed opening for receiving the articles. The mechanism includes a centrifugal feeder with a rotatable rim having a plurality of openings. Pucks are positioned beneath the openings in order to receive the articles. The pucks will be fed to the centrifugal feeder and aligned with the openings in the rim. The pucks will simultaneously move with these aligned openings beneath the rim. When the articles remaining on the rim are swept off of this rim, the pucks or at least a piece of the pucks can then be detached and conveyed away from the centrifugal feeder. The pucks are designed to maintain orientation of an article held therein even when the pucks are inverted. The pucks can also have a movable insert for exposing and orienting articles held therein.

32 Claims, 7 Drawing Sheets

ARTICLE HANDLING DEVICE, COMBINATION AND METHODS

BACKGROUND OF THE INVENTION

This application is a continuation-in-part of application Ser. No. 08/363,019 filed on Dec. 23, 1994, now U.S. Pat. No. 5,564,551, the entire contents of which are hereby incorporated by reference.

FIELD OF THE INVENTION

The present invention relates to an article handling device comprising a puck, to a combination of an article handling device and an article and to methods for handling and orienting articles.

DESCRIPTION OF THE BACKGROUND ART

Various centrifugal feeders are known in the art. However, certain articles are difficult to handle with these conventional feeders. Such articles could be top heavy or have a specific shape which is difficult to convey and/or qualify and singulate. For example, the spray assemblies for spray bottles, lipstick or other articles can be difficult to convey due to their center of gravities. Alternatively, rubbery articles such as baby bottle nipples are difficult to handle. If these rubbery articles are placed on a conveyor, when the conveyor is started, these articles will jump and become misaligned. Moreover due to a high coefficient of friction, they do not tend to slide and will often compress making conveying thereof difficult. Additionally, some articles need unique sanitary conditions which prevent them from coming into contact with certain elements in the conveying apparatus.

Additionally, it is a problem in the prior art that certain handling systems are designed for a particular article. When the article configuration changes or when other articles are to be handled, retooling of the equipment is necessary. In fact, it may be necessary to purchase an entirely new conveying system. This arrangement is not only expensive but is inconvenient for manufacturers.

Other existing problems include maintaining the orientation of an article. While an article can be conveyed in an article handling device such as a puck, it has heretofore been difficult to maintain proper alignment of the article relative to the puck if the puck is inverted. For example, if a puck such as 24 as shown in FIG. 6 handles article 100 shown in FIG. 7, the article 100 can be misaligned if a puck 24 in which the article is positioned is inverted. In particular, the article 100 can slip from the lower portion of a centrally disposed opening 70 into the area adjacent a tapering guide 76 of the puck 24. Because the walls of the tapering guide 76 do not conform as closely to the shape of the article 100, the article can become canted or otherwise misaligned with the longitudinal axis 68 of the puck. Accordingly, a need exists for a device which can maintain alignment of an article in an inverted puck.

There is also a need for an improved method for detecting empty pucks in a conveying system. This method should ensure that empty pucks are detected and sorted from filled pucks. This method could utilize specially designed pucks.

A further need in the art exists for a handling device which can accommodate very small articles. This device should be able to orient the articles while providing easy access thereto.

In addition, a need in the art exists for a qualifying, singulating and handling mechanism and method which can accommodate articles which are currently hard to handle.

Moreover, a need in the art exits for a qualifying, singulating and conveying mechanism and method which are readily changeable such that many different types of articles can be handled. Furthermore, a need in the art exists for an article handling device and method which can maintain proper orientation of an article even when the article handling device is inverted. Further, improvements in detecting and sorting empty pucks and filled pucks would be beneficial as well as the ability to handle and orient small articles.

SUMMARY OF THE INVENTION

Accordingly, it is a primary object of the present invention to provide a method and mechanism for qualifying, singulating and handling parts which are currently difficult to handle.

It is a further object of the present invention to provide a mechanism and method which can easily be modified to accommodate changes in articles to be handled.

It is another object of the present invention to provide a mechanism and method which will easily handle rubbery articles and which can maintain articles in a desired sanitary state.

Yet another object of the present invention is to provide an article handling device which can maintain the orientation of an article even when the article handling device is inverted.

Still yet another object of the present invention is to provide an article handling device whereby empty devices can easily be detected and sorted from filled devices.

An additional object of the present invention is to provide an article handling device and method which can accommodate small articles.

These and other objects of the present invention are achieved by providing a rotary puck conveying mechanism for qualifying articles and for placing the articles within a puck having an opening. This conveying mechanism includes a centrifugal feeder for supplying a plurality of the articles to its outer peripheral rim. This rim will have a plurality of openings through which the articles can fall. The pucks are placed beneath the rim in order to receive the articles. While the centrifugal feeder will convey articles to the rim of the feeder, various elements are used in order to urge the articles to fall through the openings into the pucks. These elements can include a height qualifier, one or more air jets, wipers and an off-centered wall which will move the articles towards the openings in the rim of the feeder.

The objects of the present invention are further fulfilled by a puck for receiving the article and means for feeding the article to the puck. This puck will have a longitudinal axis and means for orienting the article. The means for orienting comprises a centrally disposed opening aligned with the longitudinal axis of the puck. The centrally disposed opening has a tapering portion from an upper end to a predetermined position within the puck. These pucks will receive articles fed through the openings in the rim of the centrifugal feeder in order to hold the articles in position.

The present invention also fulfills these and other objects by a method for qualifying articles and for placing the articles within a puck. This method comprises the steps of providing a centrifugal feeder, placing the articles within the feeder and rotating the feeder to thereby move some of the articles to the rim of the feeder. Some of these articles will fall through openings provided in the rim of the feeder into pucks therebeneath. The articles resting on the rim of the feeder can be agitated to further cause some of the articles to fall through the openings in the rim of the feeder. Articles which do not eventually fall through the openings in the rim of the feeder will be removed from the rim. Pucks will be fed to the centrifugal feeder. The pucks will be aligned with the openings in the rim in order to receive the articles which fall through the rim openings. Thereafter, the pucks can be removed from the centrifugal feeder.

An article handling device of the present invention further fulfills these objects by providing a puck having a longitudinal axis and means for orienting the article in the puck. The means for orienting the article comprises a centrally disposed opening defined in the puck. The centrally disposed opening extends from a first end to a second end of the puck and is generally aligned with the longitudinal axis of the puck with the opening at the first end of the puck being larger than an opening at the second end of the puck. The centrally disposed opening tapers from the first end of the puck to an interior position within the puck to thereby form a tapering guide. The centrally disposed opening has a same size and a generally cylindrical shape from the interior position to the second end of the puck. Articles supplied to the first end of the puck fall into the centrally disposed opening while being guided by the tapering guide when the puck is vertically oriented with the first end above the second end. The articles fed into the puck conform to the puck when the articles are properly oriented whereby if an article is inverted in the puck, the article fails to properly seat in the puck such that the puck will qualify an article.

A combination of an article handling device and an article of the present invention also fulfills these objects. The article handling device comprises means for orienting the article with the means for orienting comprising an opening provided in the article handling device. The articles handling device has a first and second end, the opening in the device extends at least from the first end of the device into an interior of the device and a portion of the article extends beyond a portion of the device when the article is fully inserted into the article handling device. Only one article is fully insertable into the opening in the device.

A method for handling and orienting articles comprising the step of providing an article handling device with the article handling device having a first end and a second end and having an opening extending from the first end. The articles are fed to the first end of the device and at least a portion of one article fed to the device is received within the opening provided in the device. The method further comprises the steps of orienting the articles received in the opening to be aligned with a longitudinal axis of the opening, inverting the device and maintaining the orientation of the articles after the step of inverting such that the articles remain aligned with the longitudinal axis of the opening.

A method for handling and orienting articles comprising the step of providing an article handling device with the article handling device having a first end and a second end and having an opening extending from the first end. The articles are fed to the first end of the device and a portion of one article fed to the device is received within the opening provided in the device such that the one article is fully seatable in the device. The method further comprises the steps of orienting the article received in the opening such that the one article is longitudinally aligned with a longitudinal axis of the opening and providing an insert within the opening in the article handling device. The insert is longitudinally aligned with the opening in the device and has an opening in a first end thereof. A portion of the article is received in the opening in the insert when the one article is fully seated in the device and the insert is moved within the device to move the one article relative to the opening in the device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
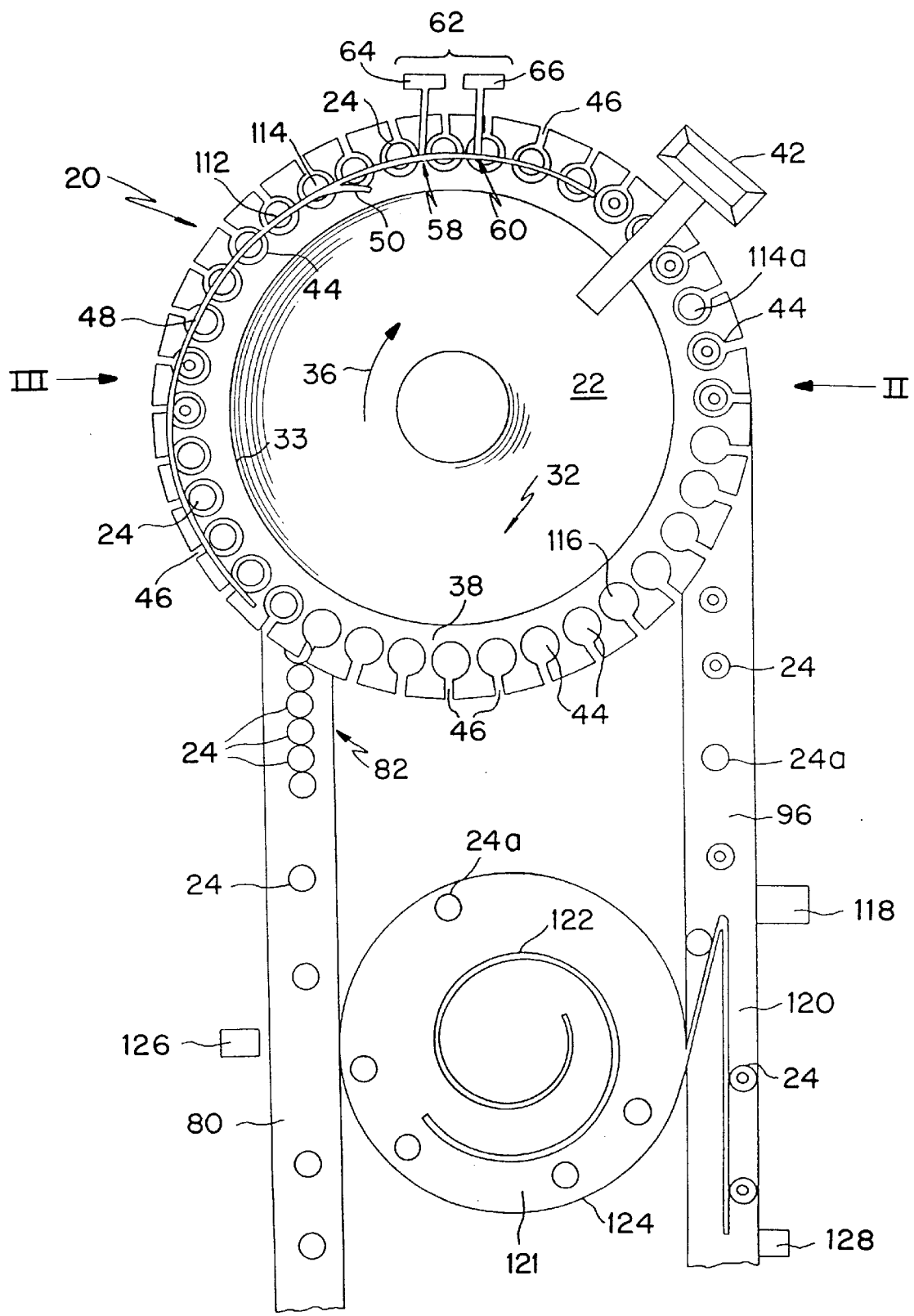
FIG. 1 is a top plan view of a first embodiment of a rotary puck conveying mechanism of the present invention.
Figure 2:
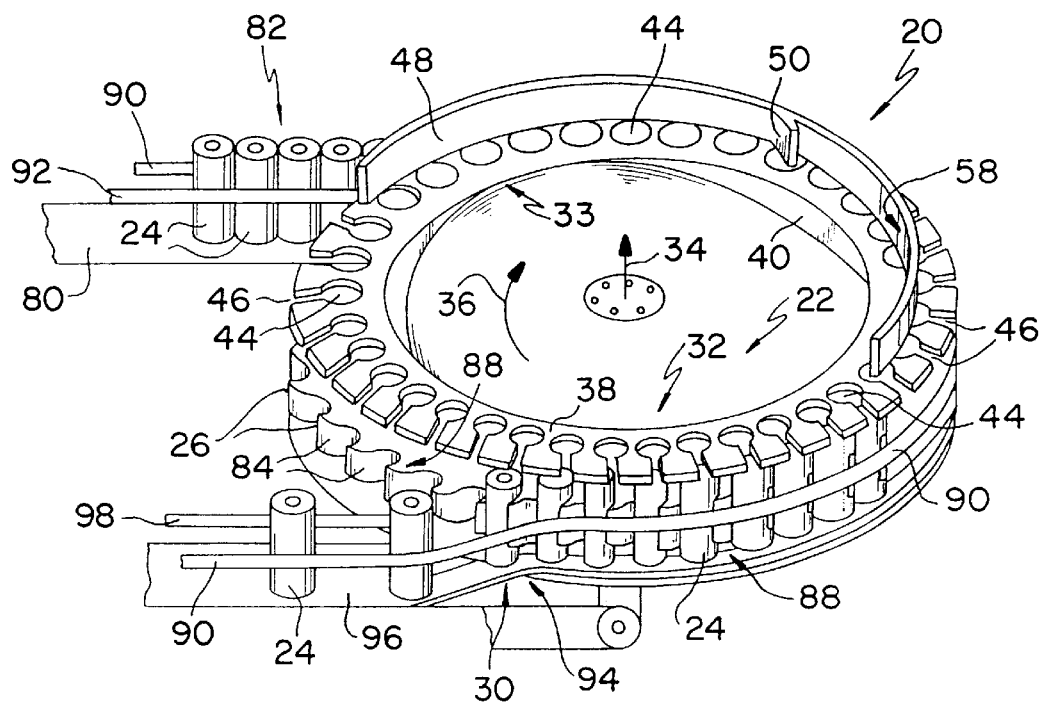
FIG. 2 is a perspective side view of the first embodiment of the rotary puck conveying mechanism as seen from arrow II in FIG. 1.
Figure 3:
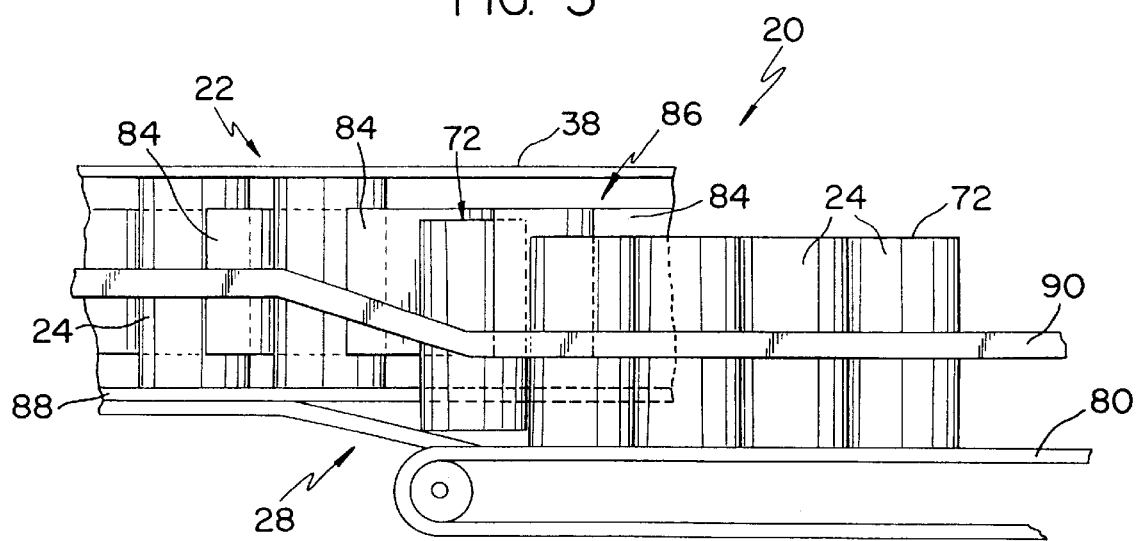
FIG. 3 is a side sectional view of the first embodiment of the rotary puck conveying mechanism as seen in the direction of arrow III in FIG. 1.

FIGS. 1–3 show a first embodiment of the rotary conveying mechanism 20 of the present invention. This mechanism 20 includes a centrifugal feeder 22. Pucks 24 are fed to the feeder 22 by feeding means 28. These pucks are conveyed around a portion of the centrifugal feeder 22 by conveying means 26. Discharge means 30 is provided for removing the pucks from the centrifugal feeder 22.

The centrifugal feeder 22 of the present invention includes a rotating disk 32. This disk 32 is rotatable about axis 34. As indicated by arrow 36 in FIGS. 1 and 2, this disk 32 will rotate in a clockwise direction. As will become evident below, the first or second embodiment of the present invention could be configured in a mirror image arrangement. Therefore, the rotating disk could be rotatable in a counterclockwise direction.

As seen in FIG. 2, this rotating disk 32 is inclined. As the disk 32 is rotated by driving means (not shown), articles thereon will be fed upwardly towards upper end 33 adjacent a rim 38 of the feeder 22. The articles will be moved onto the rim 38 by the feeder 22 at the upper end 33 of the disk 32. Inner walls 40 prevent the articles on disk 32 from coming on to the rim 38 at any other position. The articles on feeder 22 have been omitted in FIGS. 1 and 2 for clarity.

Means 42 for supplying articles to the centrifugal feeder 22 is provided. While this means is shown in a particular position in FIG. 1, it should be appreciated that this supply means 42 could be located at any position around the circumference of the feeder 22. This supply means 42 can include an upwardly inclined conveyer belt which feeds articles to a slide. The articles would move from the conveyer, down the slide and fall onto the disk 32. Of course, any suitable arrangement can be used as the means 42 for supplying articles to the centrifugal feeder 22.

In the rim 38 of the feeder, a plurality of openings 44 are provided. It should be noted that these openings 44 are shown as being uniformly spaced around the circumference of the rim 38. However, any desired spacing or number of openings 44 can be had.

Pathways 46 are provided from the openings 44 to an outer edge of the rim 38 in the first embodiment. These pathways will permit articles extending through the openings to be removed from the first embodiment of the rotary puck conveying mechanism as will be described later.

Provided above the rim 38 is a curved wall 48. This wall 48 can be semi-circular or have any other desired shape. It should be noted in FIG. 1, for example, that the wall is initially positioned outwardly of the openings 44. As the openings 44 in rim 38 rotate with the rotating feeder 22 in the direction of arrow 36, they will move beneath the stationary wall 48 such that a portion of the openings 44 are covered by the wall 48. The openings 44 are unobstructed by wall 48 at the upper end 33 of disk 32. Therefore, the disk 32 can be rotated in order to smoothly feed articles to the rim 38 without obstruction. The wall 48 will not interfere with placement of the articles on the rim but will prevent the articles from falling off the outer side of the rim 38. As the rim 38 rotates with the disk 32, the articles will move against wall 48. Because this wall 48 partially covers the articles, it will urge the articles towards the openings 44. Some of the articles will immediately fall into the openings 44 when they are discharged from the rotating disk 32 at the upper end 33 thereof. Other articles will fall through openings 44 as the wall 48 pushes them inwardly. Once an article falls through an opening 44 in rim 38, no other articles will fall therethrough until that opening is emptied of the article as will be described below.

Accordingly, the rotating disk 32 will feed articles to the upper end 33 and then onto the rotating disk 32. The wall 48 will urge some of these articles to fall through the openings 44. As the rim 38 rotates, the articles resting on the rim 38 will engage a height qualifier 50.

Figure 4:
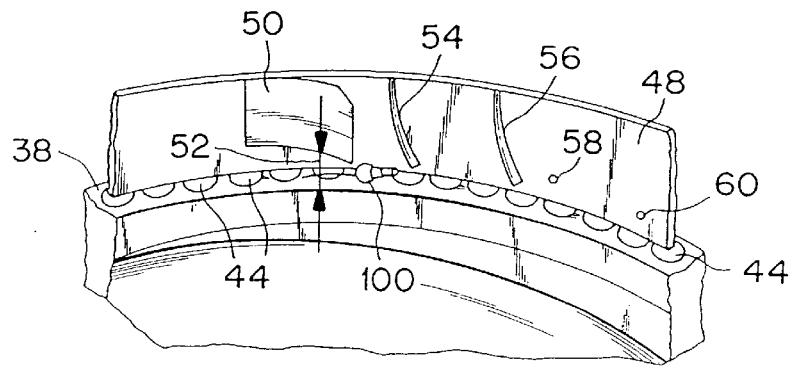
FIG. 4 is a side sectional view of an interior portion of the centrifugal feeder of the first embodiment of the rotary puck conveying mechanism of the present invention.

This height qualifier 50 is shown in detail in FIG. 4. The height qualifier 50 is spaced above the rim 38 by a predetermined spacing 52. If more than one article is positioned side by side on the rim 38, the height qualifier 50 will push the extra article back onto the rotating disk 32. Also, if an article is upstanding, the height qualifier 50 will move it outwardly away from the wall 48. This will likely cause the article to pass over one of the openings 44 in the rim 38 of the feeder. If this opening 44 is empty, the article will fall into opening 44. If, however, the opening already contains one article, the height qualifier 50 will continue to push the article such that it eventually falls back onto the rotating disk 32. Moreover, if the articles are improperly positioned such that they cannot pass through the spacing 52, the height qualifier 50 will push these articles from the rim 38 back onto the rotating disk 32. These articles which fall back onto the rotating disk 32 can be again fed by this disk to the upper end 33 thereof and thereby again placed on the rotating rim 38.

It should be appreciated that the height qualifier 50 is rigidly mounted to wall 48. For example, this height qualifier can merely be a metal flap welded to the wall 48. When the articles are "pushed" by the height qualifier, it is actually the rotation of disk 32 and rim 38 which moves the articles relative to the height qualifier 50. As the articles move in the direction of arrow 36, they either pass beneath the height qualifier or they engage the height qualifier and are moved due to the continued movement of rim 38. The curved face of the height qualifier will cause the engaged articles to move away from wall 48 and either fall into an empty opening 44 or fall back onto disk 32 as noted above. Of course, a spring biased plate, a plate that is one-piece construction with wall 44, a rod projecting from wall 44 or any other suitable means can be used as the height qualifier.

The height qualifier 50 will not remove all articles resting on the rim 38. Some articles which are properly oriented and are resting on the rim 38 can pass through spacing 52. Two rubber wipers 54, 56 are shown in FIG. 4 downstream of height qualifier 50. These rubber wiper 54, 56 will aid in agitating the articles. Any article resting on the rim 38 can be agitated in order to fall into an empty opening 44. If, however, an opening 44 is already filled by an article, these agitators may push the article from the rim 38 back onto the rotating disk 32. The articles are pushed by the wipers due to the movement of rim 38 relative to the wipers. The wipers are shown as flexible structures, fixedly mounted on the wall 48. Of course, a drive could be provided for any of the wipers in order to move them relative to wall 48 and to thereby aid in sweeping of the articles either into an empty opening or back onto disk 32.

It should be noted that FIGS. 1 and 2 do not show the rubber wipers 54, 56 for simplicity. It should be appreciated that these rubber wipers are merely located on the wall 48. While two rubber wipers are shown, any number of wipers can be used. Moreover, these wipers 54, 56 can be made from rubber or any other suitable material. Additionally, it should be noted that the second embodiment which will be described herein below does not indicate the use of the rubber wipers. However, such rubber wipers can readily be used in the second embodiment as well as the first embodiment.

Downstream from the first rubber wiper 54 and second rubber wiper are a first and second hole 58, 60 respectively. These holes 58 and 60 are connected to means 62 for supplying air jets. Means 62 can be two components, such as two air tanks with appropriate control valves or the like. These components are designated as first means 64 and second means 66. While first means 64 and second means 66 are shown in FIG. 1, it should be appreciated that these means can be combined into a single means.

The first means 64 for supplying an air jet is connected to the first hole 58. The second means 66 for supplying an air jet is connected to the second hole 60. Air can be supplied through these holes 58 and 60 in order to blow articles resting on the rim 38 of the feeder. While two air jet supply means 64, 66 are shown, any number of air jets can be used. Moreover, the location of these air jets can be changed. For example, the air jets could be located above wall 48 and can blow air downwardly on the rim 38. Any other configuration for these air jets can be had.

The first hole 58 connected to the first means 64 for supplying an air jet will supply air at a first pressure. The second hole 60 connected to the second means 66 for supplying an air jet will supply air at a second pressure. The first pressure is less than the second pressure. The first air pressure will cause air to gently blow on the articles in order to agitate them and urge the articles to fall through the empty openings 44 in the rim 38. Some articles located close to the edge of rim 38 will fall off of the rim back onto disk 32 due to the air from this air jet at hole 58. However, the primary purpose of the air jet released from the first hole 58 is to agitate articles in order to cause any articles continuing to rest on the rim 38 to fall through the openings 44. If any articles remain resting on the rim 38 downstream of first hole 58, the air supplied through the second hole 60 by the second means 66 will be sufficient to remove them from the rim. Therefore, the rim 38 should be clear of articles downstream from the second hole 60. Therefore, this second means 66 acts to blast articles remaining on the rim in order to remove said articles.

Accordingly, the rotating disk 32 of the present invention will feed articles to its upper end 33. These articles will move onto the rim 38 of the feeder. Some of the articles will immediately fall through the openings 44 in the rim 38. As stated above, once an opening 44 has an article therein, this opening will not receive another article until the opening is cleared of the article therein.

Because the rim 38 rotates with the disk 32 of the centrifugal feeder 22, the rotational movement will cause some of the articles resting on the rim 38 to fall through the openings 44. The wall 48 moving over the openings 44 will cause some of the articles resting on the rim 38 to fall through these openings 44. The height qualifier 50 will aid in orienting articles and will cause articles to fall into the openings 44. If an opening 44 is filled with an article and another article rests on the rim 38 adjacent to this opening, then the height qualifier can push this article from the rim 38 back onto the rotating disk 32. Downstream from the height qualifier 50 are the first and second rubber wipers 54, 56. These wiper help to gently agitate the articles in order to urge them to fall into openings 44. Downstream from these wiper 54, 56 is a first hole 58 connected to the first means 64 for supplying an air jet. This air jet will gently blow articles in order to cause articles resting on the rim to fall through openings 44. If any articles remain on the rim 38 when they reach the second hole 60, the air jet supplied by the second means 66 will blast these articles off the rim. These articles will fall back onto the rotating disk 32.

It should be noted that the rotation of the rim 38, the wall 48, the height qualifier 50, the two wipers 54, 56 and the air jet from the first hole 58 will cause some articles to fall off of the rim 38 back onto the rotating disk 32. However, it is desired to maintain articles on the rim 38 in an attempt to cause these articles to fall within openings 44. It is desired to have every opening around the rotating rim 38 filled. However, if any articles remain on the rim 38 when they reach the second hole 60, the second means 66 will supply an air jet sufficient to remove the articles therefrom. Therefore, each of the various elements upstream of second hole 60 helps increase the chances that an opening 44 will receive an article.

Figure 5:
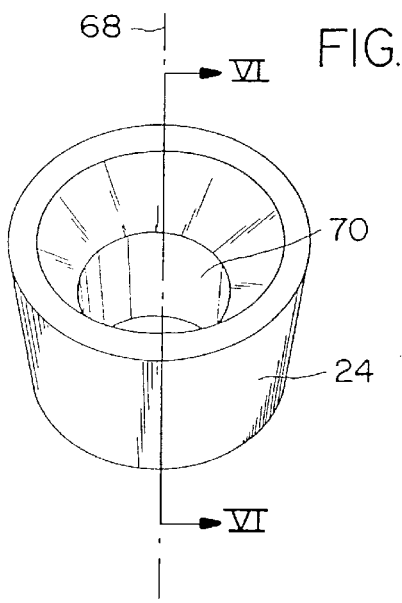
FIG. 5 is a perspective view of a puck of the present invention.
Figure 6:
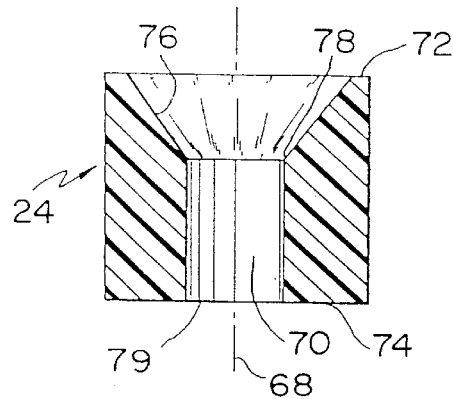
FIG. 6 is a sectional view of the puck taken along line VI—VI of FIG. 5.

As will now be described, detachably mounted beneath each of the openings 44 around a portion of the centrifugal feeder 22 are pucks 24. One of these pucks 24 is shown in FIGS. 5 and 6. Each of the pucks 24 have a longitudinal axis 68. While the pucks have a cylindrical shape and are therefore symmetrical about this longitudinal axis 68, it should be appreciated that different sized pucks can be used. Each of the pucks 24 have a centrally disposed opening 70. This opening extends from the first end or top 72 to the second end or bottom 74 of the puck. The centrally disposed opening 70 in the pucks 24 taper from the first end 72 to a predetermined position 78. This tapering portion forms a tapering guide 76 which helps to align the articles within the puck 24 as will be described below. From the predetermined position 78 to the second end 74 of the puck, the centrally disposed opening 70 has a uniform, constant diameter. As noted above, the pucks 24 can have shapes other than the cylindrical shape as shown. Also, the tapering guides 76 and centrally disposed opening 70 can have other shapes as desired.

The shape of the centrally disposed opening 70 can conform to the article being handled. Therefore, the puck can be a means for qualifying articles. If an article is feed to the puck 24 upside down, then the article will not be properly seated in the puck. A sensor (such as sensor 128) can detect the improperly seated articles and reject them. The notation of sensor 128 is merely illustrative. In other words, this sensor can be located anywhere in the system downstream of a loading station for the pucks.

The bottom 79 of the centrally disposed opening 70 in the puck 24 is shown as being opened. This opening will enable articles fed into the puck 24 to fall therefrom in order to unload the pucks downstream from the feeder 22. Alternatively, this second end 74 of the puck could be closed. In such a situation, the pucks would have to be inverted to dump articles therefrom or articles would otherwise have to be removed from the pucks 24. Articles supplied to the first end 72 of the pucks 24 will slide along tapering guide 76 into the centrally disposed opening 70 while the pucks are vertically oriented. In such a vertical orientation, the first end 72 is above the second end 74.

Returning to FIGS. 1–3, the pucks 24 are fed to the centrifugal feeder 22 by a conveyer 80. These pucks 24 will accumulate in an area 82 as will be described in detail later. As can be seen beneath rim 38 in FIG. 1, the pucks will be fed to a position in alignment with and beneath openings 44. These pucks 24 are positioned around the rim 38 as seen in FIG. 1 from a position at about seven o'clock to a position at about three o'clock. The openings 44 are free of pucks between the positions of three o'clock and seven o'clock as seen in FIG. 1.

The rim 38 and disk 32 of the centrifugal feeder 22 will rotate in a clockwise direction as indicated by arrow 36 in FIG. 1. The upper end 33 of the disk 32 will feed articles to the rim 38 at a position whereat pucks 24 are positioned beneath openings 44. It should be appreciated for simplicity, that articles on the rotating disk 32 and rim 38 have been omitted in FIGS. 1 and 2.

Beneath rotating rim 38 is the conveying means 26. This conveying means 26 includes a plurality of teeth 84 which form nests 86 for receiving the pucks 24 as will be described below. These teeth 84 are rigidly mounted with the centrifugal feeder 22. Therefore, upon rotation of disk 32 and rim 38 of the centrifugal feeder 22, these teeth 84 will simultaneously rotate. The teeth 84 are rigidly affixed to this feeder 22. However, other attachment means can be had. For example, the teeth 84 can be independently driven relative to the rotating disk 32. It is important, however, that these teeth 84 are synchronized such that pucks 24 will be positioned beneath openings 44 in order to receive the articles as will be described below.

From the conveyer 80, feeding means 28 is provided. This feeding means is basically a ramp along which the pucks 24 will slide. The pucks 24 are fed along conveyer 80 to the accumulation area 82. The aligned pucks will be held in position by the puck in front thereof. When the feeder 22 rotates in order to move the teeth 84, the forwardmost puck 24 will be engaged within nest 86 and moved up ramp of feeding means 28. The top 72 of the puck is initially out of engagement with the underside of the rim 38. As the puck is elevated moving up the ramp of feeding means 28, this puck will come into engagement with the underside of the rim 38. The teeth 84 are positioned to ensure that the centrally disposed opening 70 in the pucks will be positioned beneath the openings 44 in the rim 38. Due to the spacing of the teeth 84, the pucks are not shown as abutting one another around the periphery of the feeder 22. However, it should be appreciated that these teeth can be relatively small in order to permit the pucks to be more closely positioned.

As will be described in more detail below, the pucks 24 have a certain given outer circumference such that they will align beneath the openings 44 in rim 38. A second type of puck can be used having the same outer diameter but having a different sized central opening in the instant invention. This modified puck could then receive a different sized article than the puck shown in FIG. 5. Therefore, no changes to the size of the nests 86 or the spacing of the openings 44 in the rim 38 would be necessary when different sized articles were being handled. When handling different shaped articles or different sized articles, it is simply necessary to use different pucks in the system without the need for changing the centrifugal feeder 22 and the various components thereof.

As should be apparent, when the articles fall through the openings 44 in the rim 38, they will fall into the centrally disposed openings 70 in the pucks 24. As the pucks move around the centrifugal feeder 22, they will rest on stationary floor 88. This floor 88 blocks the opening at the lower end 79 of the puck 24 and prevents the article from falling therethrough.

Inner guides 92, 98 and outer guide 90 are shown in FIGS. 2 and 3 (but are omitted in FIG. 1 for clarity). These guides 92, 98 and 90 will aid in maintaining the pucks on conveyer 80 as well as on the stationary floor 88. The outer guide 90 encircles the centrifugal feeder 22. While this guide 90 is indicated as being continuous from the conveyer 80 and around the feeder 22, it should be appreciated that any configuration could be had.

The guide 90 could also be a separate piece from the guides used at the feeding means 28 and discharging station 94. For example, a band made of rubber or other elastic material could be provided around the periphery of at least a portion of the centrifugal feeder 22. This band could engage the pucks held on the stationary floor 88. Due to frictional contact between this elastic band 90 and the pucks, the pucks could be rotated about their longitudinal axes as they rotate with the centrifugal feeder 22. In other words, the pucks 24 would somewhat stick to the modified band 90 such that they would tend to rotate about their longitudinal axis as they are conveyed by the conveyor means 26. Such a movement will help to ensure that articles fall into the openings in the pucks 24 and are properly oriented therein. This rotation can improve the success rate for obtaining properly filled pucks.

Of course, vibrators or any other known means can be used in order to further assist proper loading of the pucks 24. Other arrangements for the guide 90 are possible. It is merely necessary to provide some guide to hold the pucks in position.

During conveying, the pucks 24 will move from conveyer 80, up the ramp of the feeding means 28 and onto the stationary floor 88. The teeth 84 on the rotating feeder 22 move these pucks in this manner. As the teeth 84 continue to rotate, the pucks will be scooted along the stationary floor 88 around the outer circumference of the feeder 22. When the pucks reach discharge station 94 as shown in FIG. 2, they will be unloaded from the nest 86 onto a discharge conveyer 96. The discharge means 30 will enable the pucks 24 to slide from the stationary floor 88 onto the discharge conveyer 96. As the pucks are pushed by teeth 84, they will move along this discharge means 30. Eventually, the pucks will disengage from teeth 84. At that time, the pucks will be on discharge conveyer 96 and will be moved away from the centrifugal feeder 22. As the pucks move down the ramp of the discharge means 30, the top 72 of the puck will disengage from the underside of the rim 38. Also, the pucks will slide along the side of teeth 84 as they move down this ramp. The outer guide 90 will continue to guide the pucks 24. The inner guide 92 adjacent conveyer 80 terminates close to the centrifugal feeder 22. A second inner guide 98 is provided along the inside of conveyer 96 to aid in guiding the pucks 24 during discharge.

While the conveyers 80 and 96 are shown to terminate beneath the centrifugal feeder 22, any configuration for these conveyers is possible. For example, these conveyers could extend beyond the centrifugal feeder as should be appreciated by one skilled in the art.

Figure 7:
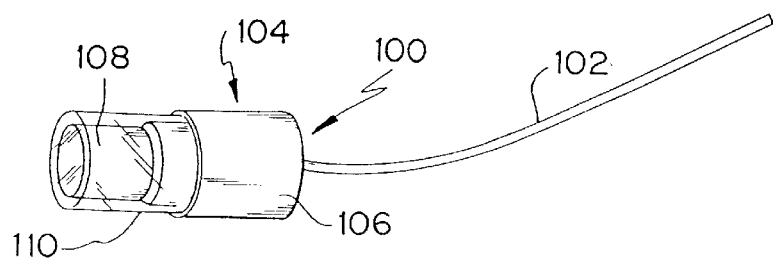
FIG. 7 is an example of an article handled by the puck conveying mechanism of the present invention.

Turning to FIG. 7, an example of an article 100 handled by the instant invention will be described. This article is a spray mechanism for a spray bottle. The article 100 includes a stem 102 and a base 104. The base 104 is made up of a body 106, a spray valve 108 and a cap 110. Of course, any type of spray valve mechanism can be conveyed by the present invention. In fact, many different types of articles such as lipstick containers, bottles with low centers of gravity, rubbery articles such as baby bottle nipples, can be conveyed. The instant invention should not be considered as being limited to conveying only spray mechanisms as shown in FIG. 7. This article 100 is merely provided for illustration purposes.

Returning to FIGS. 1, 2 and 4, the means 42 for supplying can feed articles 100 to the rotating disk 32. Upon rotation of this disk 32, the articles will move to the upper end 33 of the disk and be fed onto the rim 38 of the feeder. Some of these articles will fall into the openings 44 and the underlying centrally disposed opening 70 of pucks 24. As indicated in FIG. 1, some openings 112 have a puck and article therein while other openings 114 have only a puck with no articles while other openings 116 have no puck or article therebelow. While the present mechanism will have great success in feeding articles to the pucks 24, it should be noted that not all pucks fed to the centrifugal feeder 22 will receive articles. For example, the opening 114a shown with a puck does not include an article. This opening is downstream of the second hole 60 for the second means 66 for blasting air. No articles can therefore reach the puck beneath opening 114a. This puck will be fed from the centrifugal feeder 22 to conveyer 96 without an article therein. A second puck 24a is shown on this conveyer 96.

This puck 24a has been fed from the centrifugal feeder 22 without an article. Therefore, all pucks fed from the centrifugal feeder 22 will not necessarily have an article therein. A sensor 118 is provided along this conveyer 96. If an empty puck (such as puck 24a) passes this sensor 118, then means are provided to move this empty puck towards the left-hand side of the conveyer. Such means can include an air jet, a pusher or any other known arrangement. A diverter 120 is provided in order to move the empty pucks 24a onto an accumulation table 121. This accumulation table 121 has a centrally disposed spiral spring 122 for urging empty pucks towards the outer edge 124 of the table 121. This spiral spring 122 is stationary while the accumulating table 121 is rotatable in a clockwise direction.

Adjacent conveyer 80 is a second sensor 126. This second sensor can determine when an empty puck on table 121 is adjacent the conveyer 80. If there are no pucks presently on this conveyer 80, the empty puck will be moved onto conveyer 80. If, however, there are pucks blocking conveyer 80 then the empty puck 24a will remain on the accumulating table 121 and continue to rotate therearound. Eventually, the pucks will be moved from this accumulating table 121 onto the conveyer 80. Therefore, empty pucks are quickly recycled to the feeder 22 of the present invention. While an accumulating table and spiral spring 122 are shown, it should be appreciated that any number of items can be used in order to recirculate the pucks. Moreover, the empty pucks (such as 24a) can simply circulate with the filled pucks if so desired.

As previously noted, an accumulation area 82 is provided towards the end of conveyer 80. A sensor (not shown) is provided in order to ensure that accumulated pucks 24 are in this area. If, however, there are no pucks, this sensor will terminate rotation of the centrifugal feeder 22. Therefore, it is always ensured that a puck is provided beneath each opening 44 in the rim 38 of the feeder. If pucks were missing, the articles 100 fed through the openings 44 would fall onto the stationary floor 88 and could possibly fall from the feeder.

As seen in FIG. 2, the pucks 24 are discharged from the centrifugal feeder 22 by discharge means 30. The rotation of the teeth 84 will push these pucks down the ramp of the discharge means 30 onto the discharge conveyer 96. In FIG. 2, the articles 100 have been omitted from the centrifugal feeder 22 and the pucks 24 for clarity. However, as noted above, these articles 100 can have a stem 102. This stem 102 extends above the rim 38 of the feeder when the articles fall through the openings 44 into the pucks 24. In order to ensure that the pucks do not tip over or that the article is not damaged, pathways 46 are provided adjacent the openings 44. When the pucks are discharged by the discharge means 30, the upwardly extending stems 102 of the articles will easily slid through the pathways 46. Therefore, these stems will not be bent and no misalignment of the pucks or articles can occur. Of course, these pathways 46 can be omitted as will be described when handling other articles. Moreover, if the stems 102 are sufficiently flexible, these pathways 46 can be omitted when handling articles 100 such as shown in FIG. 7.

Downstream of sensor 118 is stem sensor 128 as seen in FIG. 1. This sensor 128 can have the dual functions of detecting articles 100 which are improperly seated in the pucks 24 and of detecting articles with missing stems. Alternatively, two different sensors can be provided. The one sensor 128 or two sensors can be located at any position downstream of an article loading station.

The sensor 118 can be used to detect missing stems. In particular, if an article 100 has been fed which does not have a stem 102, this sensor 128 can determine this condition. This sensor can then cause the puck and malformed article to be removed from the conveyer 96 before the article is subsequently handled and/or unloaded. While the sensor 128 has been discussed with regard to sensing improperly seated articles and missing stems 102, many other defective conditions for the article can be detected. This sensor 128 can then cause appropriate means to remove the article and/or puck from conveyer 96 in order to ensure that only properly formed articles 100 are treated downstream from the conveying mechanism 20.

Figure 8:
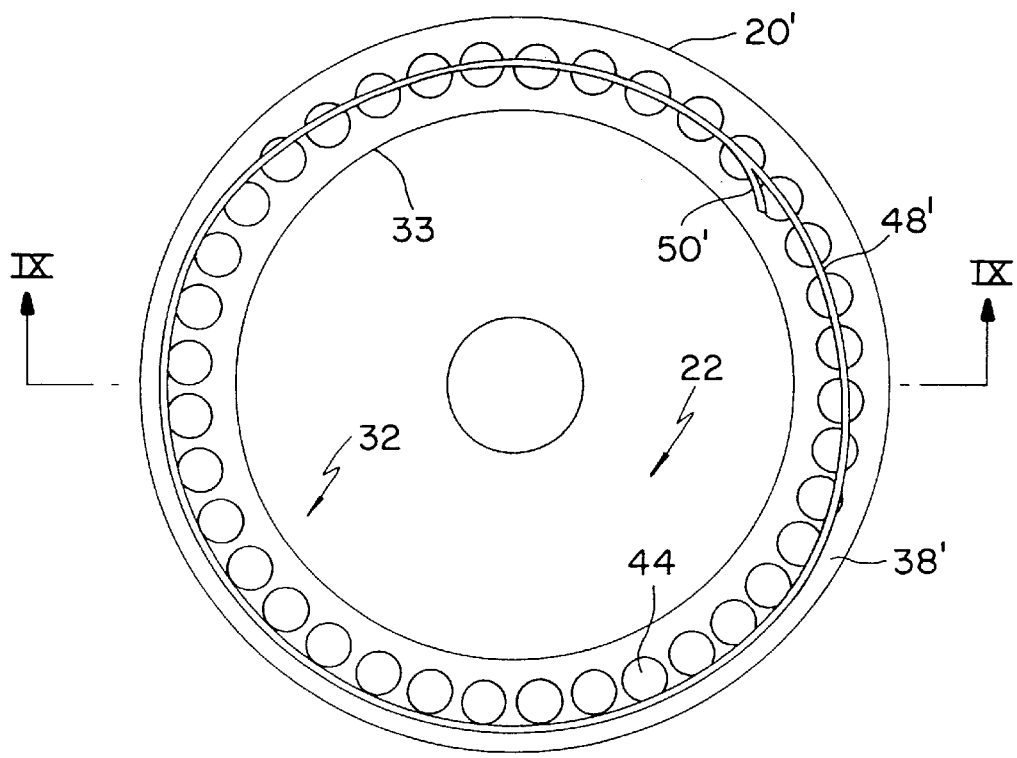
FIG. 8 is a top plan view of a second embodiment of the puck conveying mechanism of the present invention.
Figure 9:
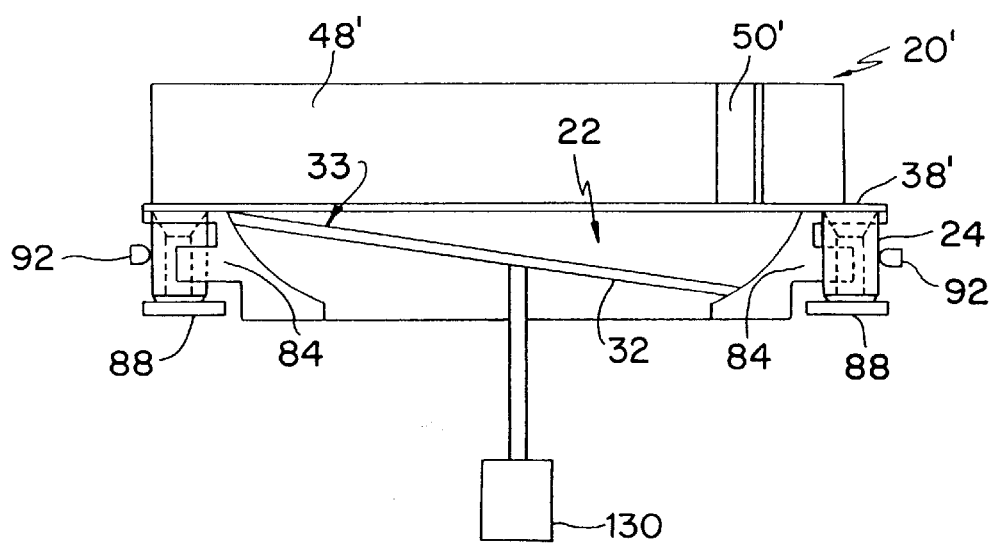
FIG. 9 is a side sectional view taken along line IX—IX of FIG. 8.
Figure 10:
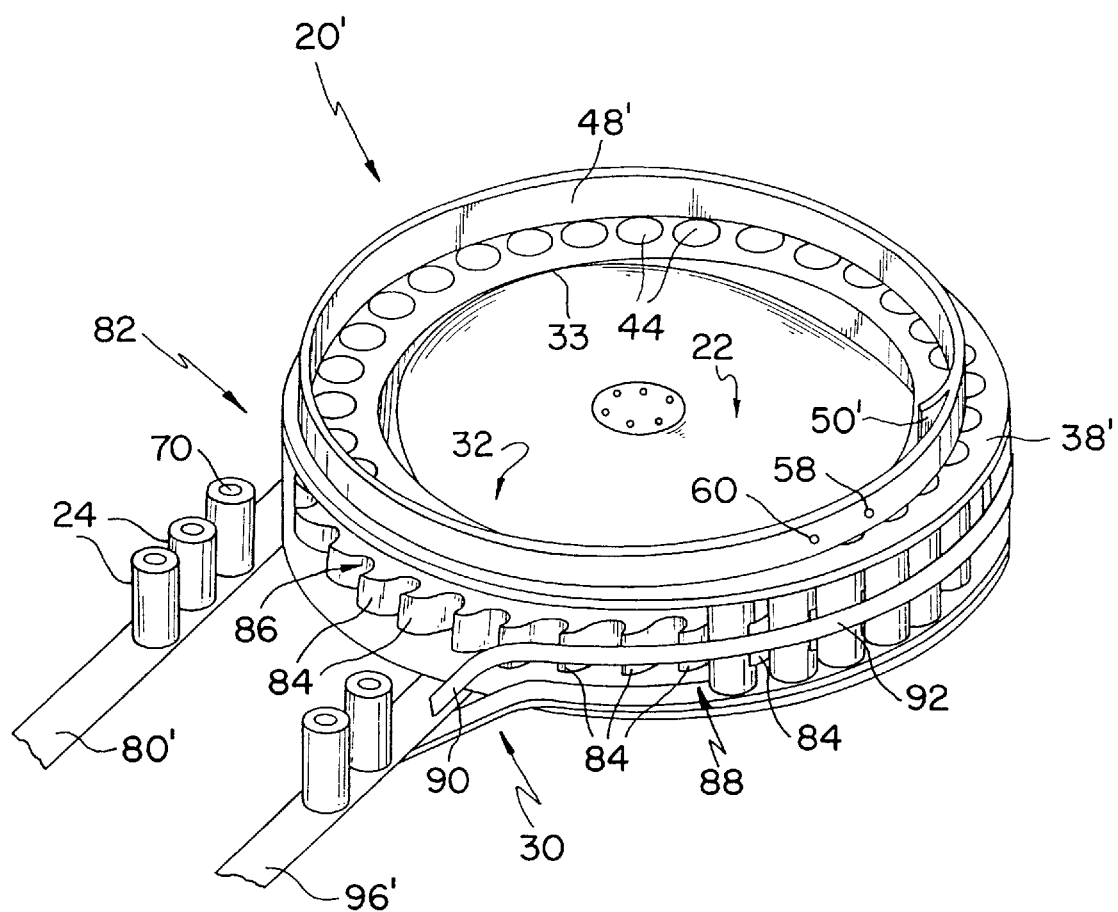
FIG. 10 is a side perspective view of the second embodiment of the rotary puck conveying mechanism of the present invention.

Turning now to the second embodiment as shown in FIGS. 8–10, a rotary puck conveying mechanism 20' is shown. Many features of this second embodiment are similar to the first described rotary puck conveying mechanism 20. Similar elements will be described by like reference numerals. One of the first readily notable differences between the conveying mechanisms 20 and 20' is that the second embodiment has a rim 38' of the centrifugal feeder 22 without pathways 46. Therefore, this second embodiment is particularly adapted to handle articles without stems. For example, lipstick tubes or other cylindrical articles can be handled. Also, rubber articles such as baby bottle nipples can easily be handled. These articles, however, can also be handled by the first embodiment of the rotary conveying mechanism 20. The presence of pathways 46 would not hinder the handling of these articles. Therefore, the first embodiment is very flexible.

As shown in FIG. 8, the wall 48' is uninterrupted around the circumference of the rim 38'. This wall 48' also has a height qualifier 50' which is located a greater distance from the upper end 33 of rotating disk 32 than in the first embodiment. This distance provides time for the articles fed to the rim 38' to settle. It therefore prevents articles from too quickly falling back onto the rotating disk 32. Of course, the spacing between the upper end 33 of the rotating disk 32 and the height qualifier 50 in the first embodiment could also be increased. The length of the wall 48 in the instant invention could therefore be increased such that this wall did not end at approximately the one o'clock position but instead ended at the two or three o'clock position as shown in FIG. 1. In this manner, not only could the height qualifier 50 but the first rubber wiper 54, the second rubber wiper 56, the first hole 58 and the second hole 60 could be located a greater circumferential distance from the upper end 33 of the rotating disk 32.

Returning to the second embodiment shown in FIGS. 8–10, the wall 48' extends completely around the rim 38'. This wall 48' will partially cover some of the openings 44 as the rim 38' is rotated. The wall 48' is stationary relative to the rim 38'. This displacement of the wall 48' relative to the rim 38' will aid in pushing articles into the openings 44.

In the second embodiment of the rotary puck conveying mechanism 20' shown in FIG. 8, the first and second wipers 54 and 56 have been omitted. These wipers, however, could readily be used in this embodiment. Also, the first and second holes 58 and 60 are merely schematically shown in FIG. 10. It should be appreciated that the means for supplying air jets 62 including the first means 64 and second means 66 is utilized in this embodiment. Of course, any combination of air jets and openings can be utilized similarly to the first embodiment.

The rotating disk 32 of the second embodiments has a plurality of teeth 84 and nest 86 similar to the first embodiment. These teeth 84 rotate with disk 32 in order to propel the pucks 24 along the stationary floor 88. FIG. 10 shows discharge means 30. The pucks in the area of the discharge means 30 have been omitted for clarity. Also, the view of the pucks through the openings 44 have been omitted in FIGS. 8 and 10 for clarity. Moreover, the feeding means 28 is not shown in any of the figures for the second embodiment but it should be appreciated that the pucks 24 can be fed to the nest 86 by such a means 28. In FIG. 10, the pucks 24 in the accumulation area 82 do not extend all the way to the feeding means 28. This has merely been done for clarity. If a situation exists where there were no pucks adjacent the feeding means 28, rotation of the disk 32 and the teeth 84 would be stopped as noted above.

In FIG. 10, the inner guides 92 and 98 have been omitted for clarity. Only a portion of the outer guide 90 is shown. Nonetheless, while certain elements have been omitted, the operation of the second embodiment should be clear. In particular, pucks 24 are fed by conveyer to accumulation area 82. The feeding means 28 will then raise the pucks up into engagement with the underside of rim 38'. The rotating disk 32 will feed articles to its upper end 33 and then onto the rim 38'. The articles should fall through openings 44 into the centrally disposed openings 70 of pucks 24. Pucks 24 are then discharged by means 30 onto conveyer 96'.

The positions at which the conveyers 80' and 96' reach the centrifugal feeder 22 are different in the second embodiment as compared to the first embodiment as shown in FIG. 1. This difference should illustrate that many different configurations and positioning for the infeed and outfeed of pucks are possible. For example, the discharge means 30 feeds pucks at an angle relative to discharge conveyer 96' in the second embodiment shown in FIG. 10. These pucks in FIG. 1, however, would feed from means 30 in the same direction in which the conveyer 96 would moves. Other configurations for the infeed and outfeed of pucks 24 are therefore possible.

In FIG. 9, the rotating disk 32 includes disk drive means 130. Any suitable means can be provided for rotating this disk 32, the centrifugal feeder 22 and the associated teeth 84. The teeth 84 will push the pucks along the stationary floor 88. The outer guides 90 will ensure that the pucks remain on the stationary floor 88. As can be seen in FIG. 9, the first end 72 of the pucks 24 is engagement with the underside of the rim 38'. Of course, the pucks 24 could be spaced from the rim 38 or 38' provided the spacing would not enable articles to become misaligned with the centrally disposed openings 70 in the pucks.

This instant invention provides for a rotary conveying mechanism for qualifying articles and placing the articles within a puck. A method is therefore provided in the instant invention wherein a centrifugal feeder is provided. Articles are placed within the feeder such as by supplying means 42. The disk 32 with the feeder 22 and rim 38 or 38' can be rotated such as by the disk drive means 130. The articles will move to the rim 38 or 38' at the upper end 33 of the rotating disk 32. The articles can be agitated by various means in order to fall through the openings 44 in the rims 38 or 38'. Articles which do not eventually fall into one of these openings are removed from the rim and returned to the centrifugal feeder 22. Pucks 24 are fed to the centrifugal feeder. These pucks 24 have centrally disposed openings 70 which receive the articles falling through the openings 44 in rims 38 or 38'. The pucks can then be removed from the centrifugal feeder.

The instant rotary puck conveying mechanism 20, 20' and method of the present invention will easily handle articles which heretobefore have been difficult to handle. For example, spray mechanism for spray bottles, lipstick or other difficult to handle articles can now easily be handled. These articles are readily qualified and singulated by the puck profile. Rubber articles such as baby bottle nipples can also easily be handled. Because the articles will be loaded onto pucks, when these articles are placed on conveyers, they can easily be moved. The pucks will ensure that the rubbery articles maintain their position and proper alignment on the conveyer. Also, the pucks will provide for sanitary handling of the articles. The articles will not directly engage the conveyer or any mechanism outside the centrifugal feeder 22. Therefore, sanitary conditions can be maintained.

Another advantage of the instant invention is that the mechanism is not rendered obsolete if a customer changes handled articles. In other words, if the shape or size of the article to be handled is changed, it is merely necessary to change the configuration of the opening 70 in puck 24. The entire centrifugal feeder 22 does not need to be retooled. This can speed production while minimizing cost.

The pucks can be made out of any desired material which is best for handling the articles. For example, if an article is tacky, the puck can be appropriately coated in order to ensure that the article will not stick. Other advantages of the instant invention should be readily be apparent to those skilled in the art.

Figure 11:
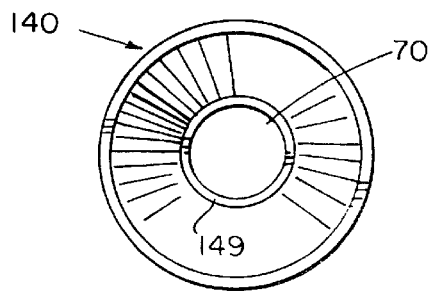
FIG. 11 is a top plan view of a second embodiment of an article handling device of the present invention.
Figure 12:
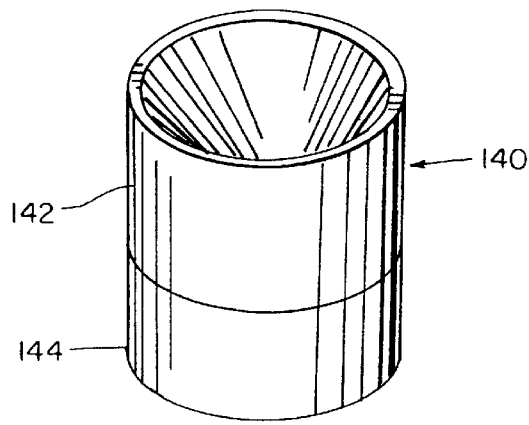
FIG. 12 is a side perspective view of the second embodiment of the article handling device.
Figure 13:
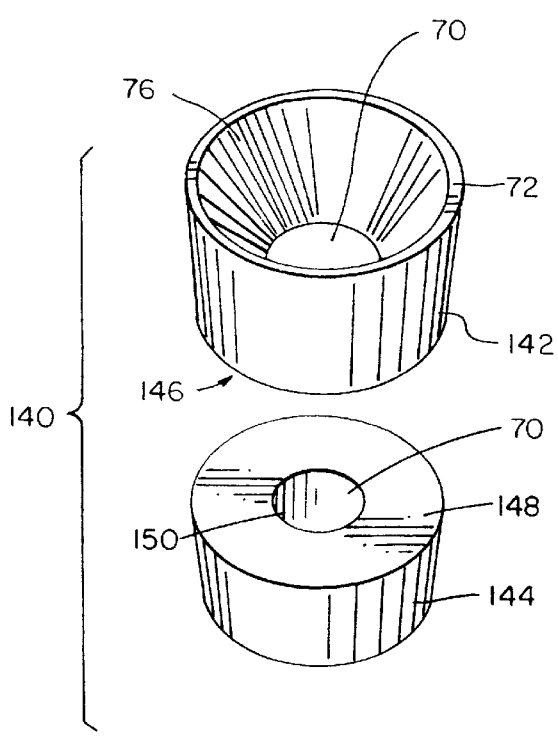
FIG. 13 is an exploded side perspective view of the article handling device.

Turning now to FIGS. 11–13, a second embodiment of the article handling device 140 is shown. This article handling device 140 or puck is formed with a first piece 142 and second piece 144. The first piece 142 has a generally flat bottom which acts as a flat mating surface 146. The second piece 144 has a generally flat top 148 which also acts as a flat mating surface. These two mating surfaces 146 and 148 are abutting surfaces for the two pieces 142 and 144. The first piece 142 will merely rest on the second piece 144.

While no interlocking arrangement is shown between these two pieces 142, 144, such an arrangement could be used. However, it is contemplated that if the second embodiment of the article handling device 140 is fed through centrifugal feeder 22, that the teeth 84 and the guides of the feeder will hold the two pieces 142, 144 together. In fact, the first piece 142 can permanently be mounted to the saw teeth 84 or any other element of the conveyor means 26 of the centrifugal feeder 22. Therefore, the conveyor 80 would simply feed the second pieces 144 to the centrifugal feeder. These pieces would move up the feeder means 28 into engagement with the flat mating surface 146 of the first piece 142 on conveyor means 26. The engaged first and second pieces 142 and 144 would be aligned by teeth 84 and conveyed simultaneously around the stationary floor 88. Upon reaching the discharge station 94, the second piece 144 would separate from the first piece 142. The first piece 142 would remain attached to the conveyor. It is contemplated that this first piece 142 will be in abutting engagement with the underside of the rim 38 of the feeder. The second piece 144 with the properly inserted article will then be discharged along conveyor 96.

Articles fed by centrifugal feeder 22 through the openings 44 will pass through the centrally disposed opening 70 in the first and second pieces 142 and 144. Similarly to the first described pucks 24, the articles which are properly seated in the second embodiment of the article handling device 140 will be maintained therein. However, if the articles are improperly seated, the height qualifier 50, means for supply air jets 62 or any of the other above disclosed elements can remove improperly seated articles. It is contemplated that most of the article handling devices 140 will receive pucks when moved around the centrifugal feeder 22 but similarly to the first embodiment, some of these devices 140 will remain empty.

While the second embodiment of the article handling device 140 has been discussed as being used with the centrifugal feeder 22 of the rotary puck conveying mechanism 20, it should be appreciated that this device can be used in any suitable environment.

Figure 14:
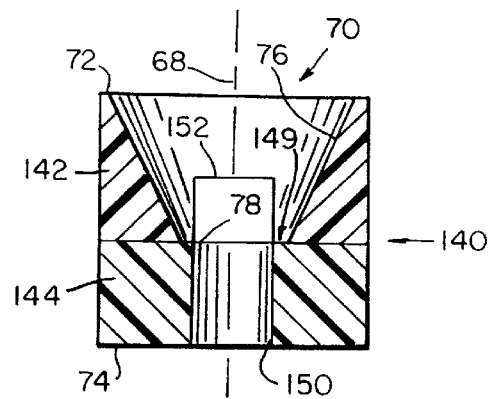
FIG. 14 is a side sectional view of the interior of the article handling device of the second embodiment.

Similarly to the previously discussed pucks 24, the second embodiment of the article handing device 140 has a longitudinal axis 68 extending through the centrally disposed opening 70 as indicated in FIG. 14. It can be seen that the first and second pieces 142 and 144 are aligned such that a continuous centrally disposed opening 70 is formed. This opening extends from a first end or top 72 of the first piece 142 to the second end or bottom 74 of the second piece 144 when the pieces are in mating configuration as shown in FIG. 14.

The centrally disposed opening 70 in the first piece 142 tapers from the first end 72 to a predetermined position 78. This predetermined position 78 is an interior position within the device 140. This tapering portion forms a tapering guide 76 which helps to align the articles within the puck 24 as has previously been described. A step 149 is formed at the interior predetermined position 78 between the first piece 142 and second piece 144 at their mating surfaces 146, 148 as shown in FIG. 14. This is because the smallest diameter of the tapering guide 76 is greater than the diameter of the constant diameter opening 150. Of course, this smallest diameter and same diameter could be the same such that no step would be provided between the first and second pieces 142, 144.

From the interior position 78 to the second end 74 of the second piece 144, the centrally disposed opening 70 is the uniform, constant diameter opening 150. As noted above, the pucks of the article handling device 140 can have shapes other than the cylindrical shape as shown. However, it is contemplated that the central opening 70 will have a generally uniform diameter in a plane perpendicular to the longitudinal axis 68. These diameters will be uniform throughout a length of the puck. In other words, while the diameter of the opening 70 might be greater in the region of the tapering guide 76 than in the region of the constant diameter opening 150, each section of the opening 70 taken in a plane which is generally perpendicular to the axis 68 will have a uniform diameter. Put another way, for a given level (plane perpendicular to the axis 68), the opening 70 will have a uniform diameter. Therefore, an oval, oblong or other unusually shaped diameter is normally not used.

The shape of the centrally disposed opening 70 will conform to the article being handled. When the article such as spray mechanism 100 is used, the diameter of the opening 150 is such that it closely conforms to the diameter of the base 104 of the article 100. While a spray mechanism for a spray bottle has been described as one article, it should be appreciated that any suitable article can be handled by the instant invention.

In FIG. 14, an article 152 has generally been designated. This article 152 generally conforms to the diameter of the opening 150. It can be seen in FIG. 14 that this article 152 extends above the mating surfaces 146 and 148. Therefore, when the first piece 142 and second piece 144 are separated, a portion of this article 152 will be exposed.

When conveyed along a conveyor such as 96 shown in FIG. 1, the articles will be moved past a diverter or deflector 120. If the article within the second piece 144 is a spray mechanism for a spray bottle as shown by article 100 in FIG. 7, then it had been contemplated that the stem 102 would extend above the puck in order to engage this deflector 120. If the stem were absent, then the sensor 118 would activate a diverter to move the puck to the accumulation table 121. Other than using such a sensor 118, it is possible to merely use a stationary sweep arm which is position above the conveyor 96. If the stem 102 were present, it would engage the sweep arm or diverter and move to an appropriate location for further processing. If, however, this stem 102 were absent, the empty puck would move beneath the diverter continuing along its path on conveyor 96. This puck could then eventually moved to an accumulation table or other suitable storage area for reuse in the system.

When engaging a portion of an article such as the flexible stem 102, a problem had been encountered in that the filled puck may also continue along its path on conveyor 96. In other words, the stem 102 would flex beneath the diverter and therefore not properly divert the filled puck.

To avoid such a problem, the second embodiment of the article handling device 140 provides for the second piece 142 to have a height which is less than the height of the article 152. This height of the article 152 could correspond to the relatively rigid base 104 of article 100. The stem 102 is not shown in FIG. 14. Of course an article without a stem could be handled by device 140.

Because the rigid portion of the article 100 extends above the flat mating surface 148 of the second piece 144, this rigid portion will be exposed when the first and second pieces 142, 144 are separated. Therefore, if a diverter or sweep arm is used, it can be positioned in order to engage the exposed portion of piece 152. It should be recognized that when the second embodiment of the article handling device 140 is moved along a conveyor such as 96, the second piece 144 is separated from the first piece 142. The article 152 will remain in the second piece 144 for subsequent handling. The diverter will be spaced above the second piece 144 but at a suitable height for engaging the exposed portion of the article 152. This diverter can then alter the path along which the second piece 144 and article 152 are conveyed. Unfilled pieces 144 would continue along in the initial conveying direction. This will act to sort filled devices 140 from empty devices. Instead of being used with stationary, sweep arms, the exposed portion of the articles 152 could be detected by sensor 118 and the filled or empty pucks could then be properly diverted.

While the article handling device 140 of the second embodiment has been described as being used with a spray mechanism of a spray bottle 100, for example, it should be appreciated that any suitable article could be conveyed as noted above. Moreover, the height of the second piece 144 could be greater than or equal to the conveyed article 152.

Similarly to the puck 24, the second article handing device 140 is shown with an opening at both ends of opening 70. Therefore, the article 152 could fall from the puck if so desired. However, the second end 74 of the device 140 could be closed if so desired. In such a situation, the pucks would have to be inverted to dump articles therefrom or articles would otherwise have to be removed from the device 104. Articles supplied to the first end 72 of the device 104 will slide along the tapering guide 76 into the centrally disposed opening 70 while the device 140 is vertically oriented. In such a vertical orientation, the first end 72 is above the second end 74.

If an article is to be removed from the device 140 by inverting the article, a problem can result from the tapering guide 76. In particular, when the puck 24 is inverted, the article can move from the uniform, constant diameter opening 150 into the area adjacent the tapering guide 76. The uniform, constant diameter opening 150 will maintain the article in alignment with the longitudinal axis 68. However, when the article is moved into the region adjacent the tapering guide 76, the article can become cocked or otherwise misaligned from the axis 68. While this misalignment may only be a few degrees, it is nonetheless desired to maintain the article in a given, known orientation. This orientation would be in alignment with the longitudinal axis of the device 140. Of course, the opening 70 could be offset from the central longitudinal axis. For example, this opening 70 could be to one side of the device 140 instead of being centrally located therein. Also, the opening 70 could be drilled or otherwise formed in device 70 such that the longitudinal axis of opening 70 was offset at an angle from the longitudinal axis of the device. Other arrangements for the opening 70 in device 140 are possible other than the shown centrally located design with longitudinal axis parallel and coextensive.

The second embodiment of the article handling device 140 provides for a system for maintaining the article in a proper orientation when the device 140 is inverted. In particular, the first and second pieces 142, 144 are separated as noted above. The article remains in the second piece 144. This second piece can have an open or closed bottom as noted above. Either way, the piece 144 and article can be inverted. There is no tapering guide 76 in the second piece 144 so that the orientation of the article will be maintained due to the closely confining opening 150. Of course, some small chamfer or minor guiding structure could be used in order to properly cam the article into the uniform diameter opening 150 in the second piece 144. However, such a slight bevel or chamfer would not enable misalignment of the article 100 or 152. Rather, when the second piece 144 was inverted, the article 100, or 152 will remain in the uniform diameter portion of opening 70. This article cannot become cocked or otherwise misaligned such that it will stay properly aligned with the longitudinal axis 68.

The centrally disposed opening 70 acts as means for orienting an article in the second embodiment of the article handling device 140 similarly to that in the first embodiment of puck 24. The articles will be appropriately held by the device 140. If the articles are inverted, or otherwise misaligned in the device 140, they will fail to properly be seat such that the device 140 also acts as a qualifier similarly to the above-discussed first embodiment puck 24.

In the second embodiment of the article handling device 140, it is contemplated that only one opening 70 will be provided per device. The longitudinal axis 68 will pass through the centers of both the first and second pieces 142, 144. Of course, other arrangements are possible.

Figure 15:
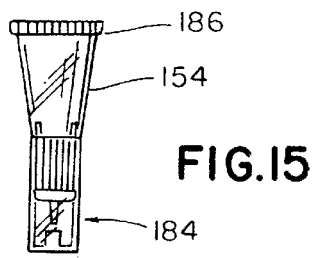
FIG. 15 is an example of a small article handled by the third embodiment of the article handling device of the present invention.

Turning now to FIG. 15, a third article 154 is shown. It should be noted that this FIG. 15 is an enlarged view such that the size of the article 154 is enlarged compared to that of the device 140 shown in FIGS. 13 or 14. This article would be smaller than these devices 140 and is contemplated as being smaller than articles 100 and 152. The total length of this article could be four and a half centimeters, for example.

Figure 16:
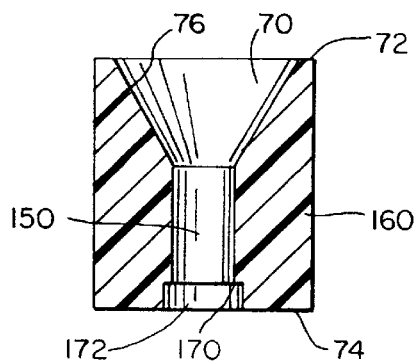
FIG. 16 is a side sectional view of a portion of the third embodiment of the article handling device of the present invention.
Figure 17:
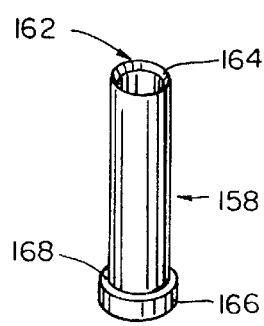
FIG. 17 is a perspective view of an insert used in the third embodiment of the article handling device of the present invention.

It is contemplated that the article 154 will be handled by a third embodiment of the article handling device 156 as shown in FIGS. 18–21. This third embodiment of the article handling device 156 or puck includes an insert 158 as shown in FIG. 17. This insert 158 is provided within the puck 160 of FIG. 16. It is contemplated that the insert 158 can be readily removed from the puck 160. However, when inserted within the puck 160, an arrangement such as shown in FIGS. 18–21 will be obtained. This insert 158 is freely slidable within the puck 158 as indicated between FIGS. 18 and 19 and between FIGS. 20 and 21. The insert 158 is longitudinally aligned with the centrally disposed opening 70 and longitudinal axis 68 in puck 160. In particular, centrally disposed opening 70 and the longitudinal axis of the puck 68 are both aligned and generally coextensive with the longitudinal axis of the insert 158 of the article handling device 156.

A description of the insert 158 will now be provided. As shown in FIG. 17, an opening 162 is provided in the center of the insert 158. This opening 162 can extend completely or only partially through the insert 158 as desired. A cammed or chamfered edge 164 is provided at the top of the insert 158 adjacent the opening 162. This chamfer will aid in insertion of articles such as 154 into the opening 164. However, this cammed camming edge 164 can be omitted if so desired.

At the bottom of the insert 158 is a shoulder 166. The upper edge 168 of shoulder 166 is engagable with the top 170 of recess 172 in the puck 160. This shoulder 166 will therefore prevent ejection of the insert 158 from the puck 160 as the insert moves from the FIG. 19 to the FIG. 18 position as will be described below. The cylindrical tube which forms the insert 158 is inserted in the central opening 70 of the puck 160. The shoulder 166 will stop insertion of the shoulder 158. However, this insert 158 can fall from the puck 160 if the puck is lifted therefrom. In other words, the insert 158 and puck 160 are not affixed together. However, a suitable stop could also be provided in order to form the insert 158 and puck 160 as a unitary, non-readily separable structure.

In addition to the recess 172, the puck 160 has a constant diameter opening 150 and tapering guide 76. Unlike the second embodiment of the article handling device 140, the third embodiment of the article handling device 150 has a one-piece puck structure 160. Of course, this puck 160 could be formed into two pieces similarly to the article handling device 140 of the second embodiment, if so desired.

The insert 158 is a generally cylindrical tube which is longitudinally reciprocable within the opening 70 of the puck 160. The opening 162 in the top of the insert 158 faces the first end 72 of the puck 160 when the insert 158 is placed in puck 160.

Figure 18:
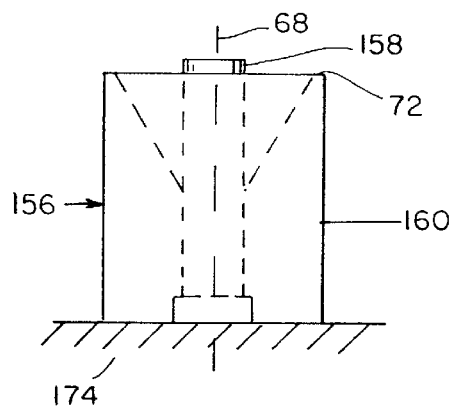
FIG. 18 is a side view of the third embodiment of the article handling device of the present invention with the insert fully inserted in the puck.

From FIGS. 18–21, it should be appreciated that the insert 158 slides within the opening 70 of the puck 160. A support surface 174 can hold both the puck 160 and the insert 158 as shown in FIG. 18. The shoulder 166 of the insert 158 will be fully engaged in the recess 172. A small portion of the insert 158 can extend above the top 72 of puck 160 as indicated in FIG. 18. However, it is possible that this insert 158 is flush with or shorter than the top 72 of puck 160.

Figure 19:
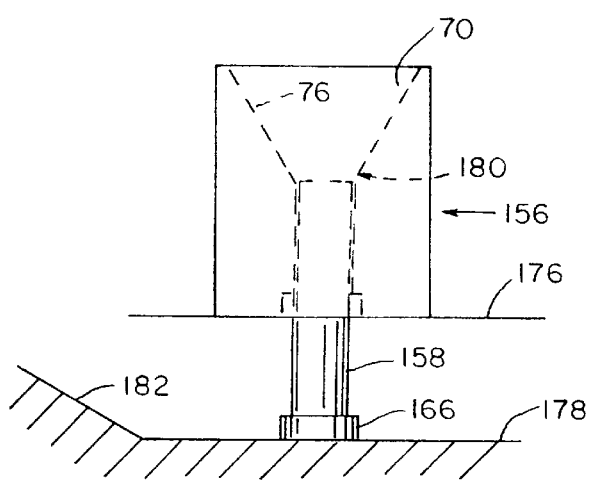
FIG. 19 is a side view of the third embodiment of the article handling device of the instant invention with the insert partially removed from the puck.
Figure 20:
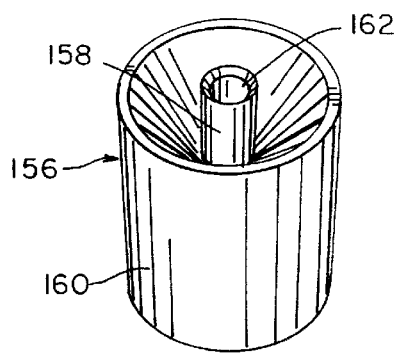
FIG. 20 is a perspective view of the third embodiment of the article handling device of the present invention as shown in FIG. 18.

As the puck 160 is moved from a position as indicated in FIG. 18 to a position as indicated in FIG. 19, two support surfaces 176 and 178 can be provided. The first or upper support surface 176 can be provided on each side of the insert 158 or can merely be on one side of the insert in order to support the puck 160. It is contemplated that a groove can simply be formed in the support surface 174 in order to form the upper and lower support surfaces 176, 178. The lower support surface 178 will support the bottom of the shoulder 166 of the insert 158. In this position, the top of the insert 158 will be located at a predetermined interior position 180 of the puck 160. This position 180 is generally where the tapering guide 76 meets the uniform diameter portion of the opening 70. While the top of the insert 158 is shown at position 180, it is contemplated that this insert 158 could be at any level within the puck 160. However, it is preferred that this insert 158 be at or lower than the interior position 180 when loading articles fed to the puck 160 such that the articles can be properly seated as will be discussed below.

The lower support surface 178 is shown as having a ramp 182. It should be contemplated that as the third embodiment of the article handling device 156 moves from the FIG. 18 to the FIG. 19 position, the puck 160 can be slid along surface 176 and the insert 158 can be slid along the ramp 182 and the lower support surface 178. As the insert 158 is moved along ramp 182, it will gradually lower within the puck 160 such that the top thereof will move to a lowered position. While not shown, a ramp similar to 182 can be provided in order to reposition the insert 158 within the puck 160 such that the article handling device 156 returns from the FIG. 19 position to a position as shown in FIG. 18.

When viewing FIGS. 1 and 2, the stationary floor 88 can be made up of the support surfaces 174, 176 and 178 and a downward and upward ramp 182. As the third embodiment article handling devices 156 are moved around centrifugal feeder 22 to a position adjacent the upper end 33 of the dish, the inserts 158 will be lowered to a position as shown in FIG. 19. The handled articles can then be fed onto the rim 38 of the feeder 22. The articles will fall through the openings 44 and be guided by the tapering guide 76 into the constant diameter opening 150. As the conveying means moves the article handling devices 156 past the height qualifier 50, the means 62 for supplying air jets and the wipers 54 and 56, it is contemplated that the insert 158 will remain in its lowered position as shown in FIG. 19. Before being discharged from the centrifugal feeder 22, however, the insert 158 will then be raised back into the puck 160. The article such as 154 contained within the article handling device 156 will then be discharged with the device 156 to the conveyor 96 or other appropriate discharge device. When the device 156 is discharged, the insert 158 will be in a position as indicated in FIG. 18.

Of course, a suitable discharge arrangement can also be provided such that the insert 158 is in an intermediate position between that shown in FIGS. 18 and 19 or any other suitable position. However, it is contemplated that the top of the insert 158 will be above the predetermined interior position 80. In this manner, the neck 184 of article 154 as shown in FIG. 15 can be received within the opening 162 of the insert 158. This action will therefore result in alignment of the article 154 with the vertical axis of the puck 168. This alignment will be maintained throughout the subsequent discharge and handling of the article handling device 156. Also, when the insert 158 moves from the FIG. 19 to the FIG. 18 position, this will lift the relatively small article 154. The article 154 will therefore be easier to grasp for discharge or subsequent handling. Also, if the device 156 and article 154 were inverted, the engagement of the article 154 within insert 158 would help to maintain the orientation of the article. Similarly to the second embodiment, the tapering guide 78 of the puck 60 would not adversely effect the orientation of the article.

As noted above, it is contemplated that the insert 158 will be in the lowered position of FIG. 19 throughout certain positions around the centrifugal feeder 22. It is contemplated that this insert 158 will be in the lower position at least in the area of the upper end 33 of the dish such that the insert 158 will not interfere with articles sliding into the interior of the puck 70. The bottom 186 of the article 154 is sufficiently wide to prevent the article from completely falling within the opening 162 of the insert 158. However, the bottom of opening 162 in insert 158 could be arranged to prevent any thin or cylindrical article from falling completely therein. The neck 184 is sized such that it will fit within the opening 164.

It is also contemplated that the insert 158 will also be in a lower position in the area of the height qualifier and other elements for discharging improperly seated articles. In this manner, such improperly seated articles will be assuredly to be discharged from the third embodiment of the article handling device 156.

It was discussed above that the insert 158 would remain in its lowered position throughout most of its movement around the centrifugal feeder 22. However, ramps can be provided such that repeated raising and lowering of the insert 158 would be possible. This could help in properly seating articles within the article handling device 156. Nonetheless, such up and down movement should not interfere with the initial loading or subsequent qualifying of the articles. Vibrators or other devices could also be used to improve the success rate for properly seating articles.

Figure 21:
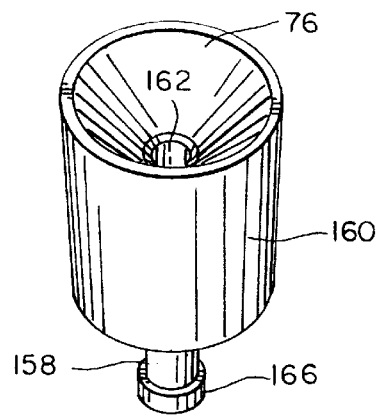
FIG. 21 is a side view of the third embodiment of the article handling device of the present invention as seen in FIG. 19.

In FIGS. 21 and 22, the insert 158 in the raised and lowered positions, respectively, is shown. It should readily be apparent from FIG. 21 how the articles 154 slide along tapering surfaces 76 into the opening 162 of the insert 158.

While a particular article 154 has been illustrated in FIG. 15 and discussed for use with the third embodiment of the article handling device 156, it should be appreciated that any suitable article can be used with this device. For example, a uniform cylindrical, square or other appropriately shaped article can be handled. It is contemplated that the portion of the article inserted into the opening 162 in the insert 158 will conform to the shape of this opening. This will help to ensure proper orientation of the article relative to the longitudinal axis 68 of the device 156.

Apart from the use of pucks 24 or article handling devices 140, 156, it is contemplated that the instant invention can also be directed to a combination of such pucks or handling devices with the articles themselves. Such a combination or package would have a portion of the article extending beyond the top 72 or 148 of the puck or handling devices. It is also contemplated that only one article will be able to be fully insertable into the pucks or handling devices. The opening 70 in the pucks or devices will conform to the shape of the article such that the article can be properly seated therein. Accordingly, when a plurality of articles are supplied to the first end of the puck 24 or devices 140, 156, the one fully inserted article can readily remain in the device while the other articles can be discharged therefrom. This one fully inserted article will be readily removable from the article handling device.

The present invention is also directed to a method for handling and orienting articles such as articles 100, 152 and 154. An article handling device such as 140 or 156 can be provided. This article handling device 140, 156 will have first and second ends with an opening 70 extending from the first end. Articles 100, 152, 154 or any other suitable article can be fed to the first end of the device. A portion of the article will be positioned within the opening of the device. This will orient the article such that it is aligned with the longitudinal axis 68. The device then can be inverted such that the proper orientation of the article is maintained.

Another method of the instant invention can also include the steps of providing an article handling device such as 140, 156. Articles such as 100, 152, 154 or any suitable article can be fed to these devices 140, 156. At least a portion of the articles received within an opening in the device is oriented such that it is aligned with the longitudinal axis 68. An insert 158 can be provided within the opening 70 of the article handling device 156. This insert is aligned with the longitudinal axis 68 and has an opening 162 provided therein. A portion of the article such as neck 184 of article 154 can be received in this opening 162. The insert can be moved such as from a position shown in FIG. 19 to a position shown in FIG. 18 in order to expose the article 154 within the device 156.

Similarly to puck 24, the article handling devices 140, 156 can be made from any suitable material. For example, if a tacky article is being handled, the puck can be coated in order to ensure that the article will not stick. The pieces 142 and 144 of the second embodiment and the puck 160 of the third embodiment of the article handling device 156 can be made from a plastic material. The insert 158 can be made from a metal material. Of course, any other suitable materials for this device 156 can be provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An article handling device comprising a puck having a longitudinal axis and means for orienting an article in the puck, the means for orienting the article comprising a centrally disposed opening defined by the puck, the centrally disposed opening extending from a first end to a second end of the puck and being generally aligned with the longitudinal axis of the puck, the opening being larger at the first end of the puck than at the second end of the puck, the centrally disposed opening tapering from the first end of the puck to an interior position within the puck to thereby form a tapering guide, the centrally disposed opening having a same size and a generally cylindrical shape from the interior position to the second end of the puck, articles supplied to the first end of the puck fall into the centrally disposed opening while being guided by the tapering guide when the puck is vertically oriented with the first end above the second end, articles fed into the puck conforming to the puck when the articles are properly oriented whereby if an article is inverted in the puck, the article fails to properly seat in the puck such that the puck will qualify an article.

2. The article handling device as set forth in claim 1, wherein only one opening is provided in the article handling device.

3. The article handling device as set forth in claim 2, wherein the opening has a generally uniform diameter in a plane perpendicular to the longitudinal axis of the puck.

4. The article handling device as set forth in claim 3, wherein the diameter of the opening in a plane perpendicular to the longitudinal axis of the puck is uniform throughout a length of the puck.

5. The article handling device as set forth in claim 1, wherein the puck is formed from a first piece and a second piece, the longitudinal axis and the means for orienting passing through both the first piece and the second piece, the centrally disposed opening tapering in the first piece and having the generally cylindrical shape in the second piece.

6. The article handling device as set forth in claim 5, wherein the puck has a generally cylindrical shape, the first and second pieces being detachably mountable together with the longitudinal axis passing generally through centers of both the first and second pieces.

7. The article handling device as set forth in claim 6, wherein the first piece has a flat mating surface and the second piece has a flat mating surface, the flat surface of the first piece resting on the flat surface of the second piece when the pieces are mounted together.

8. The article handling device as set forth in claim 1, further comprising an insert provided within the opening in the puck, the insert being movable within the opening.

9. The article handling device as set forth in claim 8, wherein the insert is longitudinally aligned with the opening in the puck and wherein the insert has an opening in a first end thereof for receiving an article received into the first end of the puck.

10. The article handling device as set forth in claim 9, wherein the insert is a generally cylindrical tube with a shoulder provided on one end thereof and wherein the second end of the puck has a recess provided around the opening therein, the recess conforming to the shape of the shoulder and the shoulder being engagable in the recess when the tube is fully inserted into the opening.

11. The article handling device as set forth in claim 9, wherein the insert is a generally cylindrical tube longitudinally reciprocable within the opening of the puck and wherein the opening in the first end of the tube faces the first end of the puck.

12. A combination of an article handling device and an article, the article handling device comprising means for orienting the article, the means for orienting comprising an opening provided in the article handling device, the device having a first end and a second end, the opening in the device extending at least from the first end of the device into an interior of the device and the opening tapering from the first end of the device to an interior position within the device whereafter the opening has a generally constant size and a portion of the article extending beyond a portion of the device when the article is fully inserted into the article handling device, only one article being fully insertable into the opening in the device.

13. The combination as set forth in claim 12, wherein the opening in the device conforms to a shape of the article and will qualify a properly seated article such that when a plurality of articles are supplied to the first end of the device, the one article fully inserted into the opening can readily remain within the device.

14. The combination as set forth in claim 13, wherein the one article fully inserted into the opening is detachably mounted within the device and wherein the opening extends completely through the device, the one article only being partially inserted into the device when the one article is fully inserted into the opening such that the portion of the article extends beyond the first end of the device.

15. The combination as set forth in claim 12, wherein the portion of the article extending beyond the first end of the device is rigid and inflexible whereby engagement of the portion of the article by a deflector during conveying of the combination will assuredly alter a path of movement of the article.

16. The combination as set forth in claim 12, wherein the device is a puck having a longitudinal axis and wherein the opening is centrally disposed within the puck, the centrally disposed opening extending from the first end to the second end of the puck and being generally aligned with the longitudinal axis of the puck.

17. The combination as set forth in claim 16, wherein the opening in the puck conforms to a shape of the article and wherein the opening is larger at the first end of the puck than at the second end of the puck, the tapering of the centrally disposed opening from the first end of the puck to an interior position within the puck thereby forms a tapering guide, the centrally disposed opening having the same size and a generally cylindrical shape from the interior position to the second end of the puck, the article being supplied to the first end of the puck and falling into the centrally disposed opening while being guided by the tapering guide when the puck is vertically oriented with the first end above the second end.

18. The combination as set forth in claim 16, wherein the opening has a generally uniform diameter in a plane perpendicular to the longitudinal axis of the puck.

19. The combination as set forth in claim 16, wherein the diameter of the opening in a plane perpendicular to the longitudinal axis of the puck is uniform throughout a length of the puck.

20. The combination as set forth in claim 16, wherein the puck is formed from a first piece and a second piece, the longitudinal axis and the means for orienting passing through both the first piece and the second piece, the centrally disposed opening tapering in the first piece and having a generally cylindrical shape in the second piece.

21. The combination as set forth in claim 20, wherein the puck has a generally cylindrical shape, the first and second pieces being detachably mountable together with the longitudinal axis passing generally through centers of both the first and second pieces, the portion of the article extends out of the first piece at least when the first and second pieces are separated.

22. The combination as set forth in claim 16, further comprising an insert provided within the opening in the puck, the insert being movable within the opening and the portion of the article extending beyond the first end of the device at least when the insert is fully seated in the puck.

23. The combination as set forth in claim 22, wherein the insert is longitudinally aligned with the opening in the puck and wherein the insert has an opening in a first end thereof for receiving the article received into the first end of the puck.

24. A method for handling and orienting articles comprising the steps of:

providing an article handling device, the article handling device having a first end and a second end and having an opening extending from the first end thereof, the article handling device having a first piece and a second piece;

feeding articles to the first end of the device;

receiving at least a portion of one article fed to the device within the opening provided in the device;

orienting the one article received in the opening to be aligned with a longitudinal axis of the opening;

separating the first piece of the article handling device from the second piece;

inverting the device; and maintaining the orientation of the one article after the step of inverting such that the article remains aligned with the longitudinal axis of the opening.

25. The method for handling and orienting articles as set forth in claim 24, wherein the article handling device comprises a puck with the opening extending through both the first and second pieces and wherein the step of separating the first piece of the article handling device from the second piece leaves the article with the second piece.

26. The method for handling and orienting articles as set forth in claim 25, wherein the first piece has the first end to which the articles are fed and wherein the step of orienting comprises moving the articles through the opening from the first piece into the second piece.

27. The method for handling and orienting articles as set forth in claim 26, further comprising the steps of:

locating the article within the second piece of the puck after the step of separating such that a portion of the article extends beyond the second piece;

conveying the second piece with the article along a path;

engaging the portion of the article extending from the second piece with a deflector; and altering the path along which the second piece is conveyed during both the steps of conveying and engaging.

28. The method for handling and orienting articles as set forth in claim 25, wherein the step of maintaining comprises the step of providing the opening in the second piece of the puck, the opening closely conforms to a shape of the article.

29. A method for handling and orienting articles comprising the steps of:

providing an article handling device, the article handling device having a first end and a second end and having an opening extending from the first end thereof;

feeding articles to the first end of the device;

receiving a portion of one article fed to the first end of the device within the opening provided in the device such that the one article is fully seatable in the device;

orienting the article received in the opening such that the one article is longitudinally aligned with a longitudinal axis of the opening;

providing an insert within the opening in the article handling device, the insert being longitudinally aligned with the opening in the device and having an opening in a first end thereof;

receiving the portion of the article in the opening in the insert when the one article is fully seated in the device;

moving the insert within the device to move the one article relative to the opening in the device; and removing the article from the first end of the device whereby articles enter the device in a first direction and exit the device in an opposite second direction.

30. The method for handling and orienting articles as set forth in claim 29, wherein the step of moving the insert comprises moving the insert between a first and second position, the insert being received within the device when in the second position and partially extending from the device when in the first position, the step of moving the insert comprises sliding the insert from the first position to the second position to thereby expose at least a portion of the one article by projecting the one article beyond the first end of the device.

31. The method for handling and orienting articles as set forth in claim 29, further comprising the steps of:
   reciprocating the insert within the device, the step of moving being a part of the step of reciprocating; and
   removing the article from both the device and the insert in the step of removing.

32. The article handling device as set forth in claim 1, wherein the puck has a generally cylindrical shape.

* * * * *